Sept. 7, 1954  W. GEBAUER ET AL  2,688,153
LUBRICATING DEVICE FOR PLASTIC SHAPING APPARATUS
Filed March 8, 1951
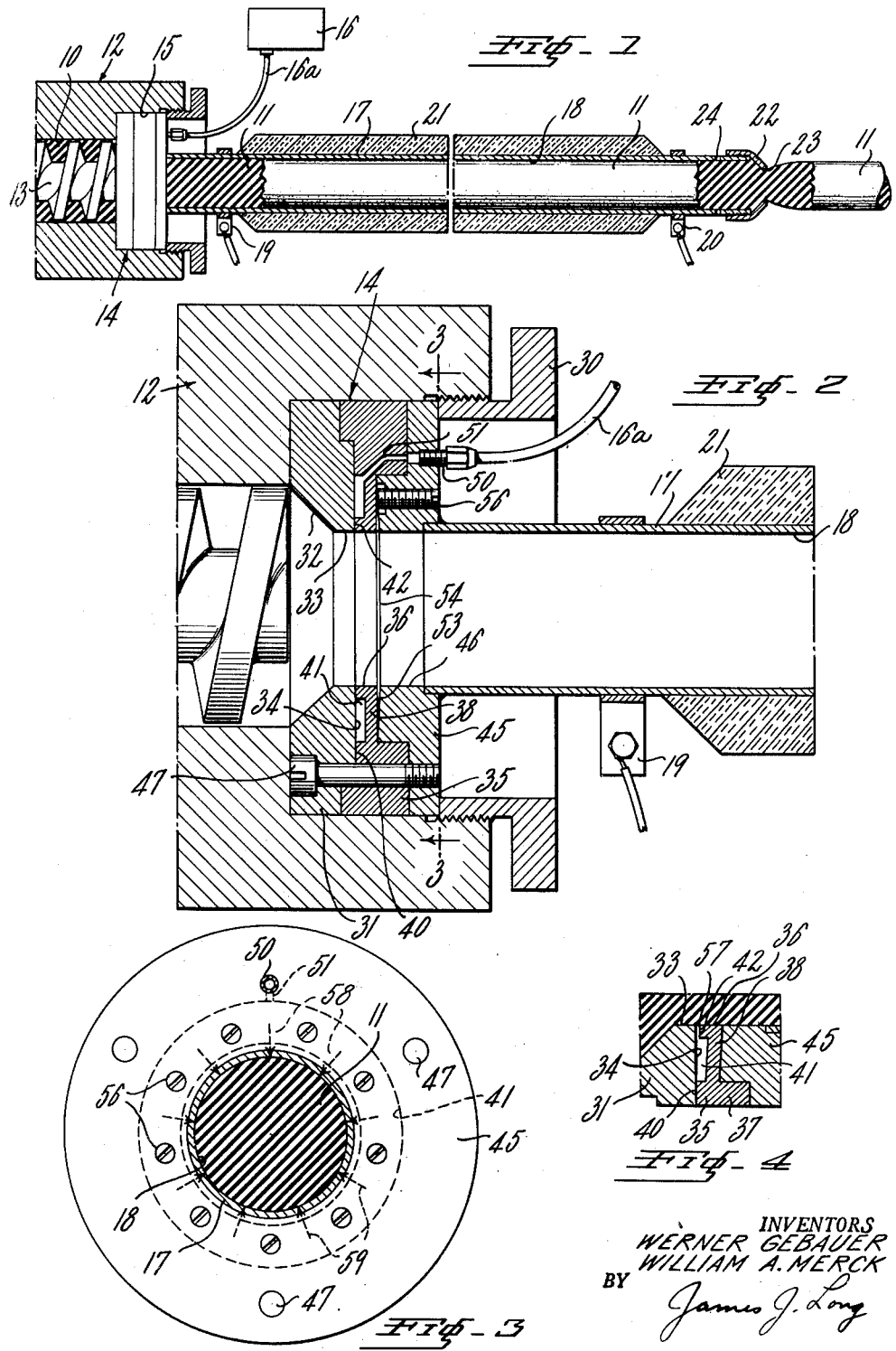
INVENTORS
WERNER GEBAUER
WILLIAM A. MERCK
BY James J. Long
AGENT Patented Sept. 7, 1954

2,688,153

UNITED STATES PATENT OFFICE 2,688,153

LUBRICATING DEVICE FOR PLASTIC SHAPING APPARATUS

Werner Gebauer, New York, N. Y., and William A. Merck, Rutherford, N. J., assignors to United States Rubber Company, New York, N. Y., a corporation of New Jersey Application March 8, 1951, Serial No. 214,586

3 Claims. (Cl. 18—12)

This invention relates to plastic shaping apparatus, and more particularly it relates to means for lubricating the surface of a plastic mass as it is moved in engagement with a confining surface.

In the shaping of plastic masses, it has relatively recently been found advantageous to move the shaped plastic mass with respect to a stationary surface, such surface serving to confine the mass in the desired shape for a definite period of time. Such a procedure is useful either in the continuous production of heat-set or vulcanized plastic shapes, or in the shaping of raw plastic masses, such as vulcanizable rubber preforms, which are to be subsequently vulcanized, as described in co-pending applications of T. J. Rhodes, Serial No. 124,827, filed November 1, 1949, now Patent No. 2,624,914, and of T. J. Rhodes and J. J. Neville, Serial No. 164,282, filed May 25, 1950, and assigned to same assignee as the instant application. In such processes it has been found essential to provide a uniform, continuous, thin film of liquid lubricating substance between the surface of the plastic mass and the confining surface, to prevent disrupting strains in the plastic mass occasioned by frictional engagement with the confining surface. The present invention is directed to a novel and improved means for applying lubricant to the surface of the advancing plastic mass.

One object of the invention is to provide an apparatus for shaping of plastic masses, such as an extrusion apparatus, in which a liquid lubricant is applied to the shaped plastic mass in the form of a thin, uniformly distributed, continuous film.

Another object of the invention is the provision of a lubricating means for plastic streams which does not readily become clogged with plastic.

Still another object is the provision of a lubricating means capable of delivering liquid lubricant at a predetermined pressure.

A further object is to provide a lubricating means for applying lubricant to a plastic shape under pressure, which functions uniformly, independently of fluctuations of pressure within the plastic shape.

Still a further object is to provide a lubricant applicator which is adaptable to uniform lubrication of large or irregularly shaped plastic masses.

It is also an object of the invention to provide a lubricant applicator which does not produce surface markings on a plastic stream passed in contact therewith.

An apparatus for accomplishing these and other objects and advantages is illustrated in the accompanying drawings, wherein:

Fig. 1 is a longitudinal sectional elevation of an extruding apparatus embodying a lubricating device of the present invention, in process of extruding a plastic rod;

Fig. 2 is a similar view of a portion of the apparatus of Fig. 1 on a larger scale, showing the lubricating device in more detail;

Fig. 3 is a transverse sectional view of the apparatus taken along line 3—3 of Fig. 2; and Fig. 4 is a fragmentary view of a portion of the apparatus of Fig. 2.

The invention contemplates provision of a lubricating gland associated with the surface of a confining and shaping means, such as an extruding die, along which a plastic mass is being moved. The lubricating gland is so constructed that the plastic mass, even though it is under considerable pressure, is not able to enter into the lubricant supply passages, because the lubricating gland presents an open passageway for the lubricant only when the pressure of the lubricant exceeds a predetermined value in excess of the pressure on the plastic. The lubricating gland is normally closed when the lubricant pressure in the delivery passages falls below this predetermined value.

Referring to the drawing, Fig. 1 shows an extrusion device for extruding plastic material, such as vulcanizable rubber stock 10, in the shape of a cylinder or rod 11. The apparatus is adapted to continuously vulcanize the rod 11 as it is extruded, and includes an extruder 12 having a rotating feeding screw 13 which feeds the vulcanizable rubber stock 10 continuously under pressure through a shaping die and lubricating assembly 14 located within a recess 15 at the delivery end of the extruder 12. It will be understood that the extruder is equipped with the usual entrance hopper (not shown) into which the plastic rubber stock to be extruded is fed, as well as with means (not shown) for heating the plastic stock 10 to a suitable temperature as it is extruded.

As the plastic material 10 streams from the extrusion chamber through the die and lubricating assembly 14 it is shaped in the form of a rod 11 and it has a thin, continuous liquid lubricating film applied to its surface, such lubricant being supplied from a suitable positive pumping device, such as a reciprocating piston pump 16, through a lubricant supply line 16a leading into the die assembly 14. The lubricated, shaped rod 11 of rubber thereafter passes into a horizontally extending elongated die member or confining tube 17 which is attached to the delivery end of the die and lubricating assembly 14, and which has an internal longitudinal passageway 18 of the same cross-sectional size and shape as the passageway through the die assembly. The tube 17 thereby constitutes an extension or continuation of the shaping die. The thin film of lubricant supplied to the surface of the plastic rod 11 prevents frictional engagement of the surface of the plastic with the wall of the passageway 18, thereby making it possible for the rod 11 to pass through the tube 17 without having distorting or disrupting strains exerted thereon, and resulting in a finished vulcanized rod of smooth appearance and homogeneous structure.

As shown, the tube 17 is provided with heating means comprising electrical clamps 19 and 20 disposed near opposite ends thereof to provide for passage of electric current through the tube to heat it to vulcanizing temperatures. The tube 17 is also provided with an external jacket 21 of suitable heat-insulating material over the major portion of its length. As the lubricated vulcanized rubber rod 11 streams through the passageway 18 it is heated to vulcanizing temperatures and emerges from the passageway in either a completely or partially vulcanized state, as desired, depending upon the length of the tube, the temperature of the tube, the speed of extrusion and the character of the vulcanizable stock employed.

The exit end of the tube 17 is provided with a snubbing means comprising a nozzle-like reducing member 22 which is threaded onto the end of the tube. The snubber is tapered inwardly to form a restricted exit passageway 23. This restriction provides sufficient resistance to the flow of the rubber rod to permit development of the desired pressure within the confining passageway 18. In this way the rubber stock is firmly compacted in the desired shape within the passageway 18, and a dense, homogeneous vulcanized product can be obtained.

To prevent the accumulation of lubricant at the exit snubber 22, a number of radial bleed holes 24 are provided in the wall of the tube 17, just before the snubber.

Considering now the die and lubricating assembly 14 in more detail, and referring particularly to Fig. 2, the circular assembly 14 is maintained firmly in place within the coextensive circular recess 15 in the head of the extruder 12 by means of a lock-nut 30 that is threaded into the open end of the recess 15. The assembly 14 includes a vertically disposed annular plate 31 constituting the die member proper which initially shapes the plastic stock 10 in the desired shape. The die plate 31 has a central circular opening therethrough for the plastic constituted of a forwardly inwardly tapered extrusion passage 32, the larger diameter of which abuts the extrusion chamber, and terminating in a straight passage 33 or "land" having essentially the cross sectional size and shape of the desired rubber rod.

Abutting the forward vertical face 34 of the die plate, there is a vertical annular plate 35 constituting the lubricating gland proper, and having a central horizontal circular passageway 36 for the plastic material, constituting a continuation of the die passageway 33. The outer zone 37 of the gland plate 35 is made relatively thicker, and is therefore more rigid, than the inner zone 38 of the gland plate, which is made relatively thinner, because such inner zone is intended to flex slightly in a direction essentially parallel to the flow of plastic under the influence of the pressure in the lubricant supply passages, as will be explained below.

The vertical face 40 of the gland plate 35 abutting the forward face 34 of the die plate 31 is provided with an annular recess 41 for lubricating liquid extending around the inner zone 38 of the gland plate, and spaced from the extrusion passage by the relatively narrow centermost circular zone 42 of the gland plate face 40. The zone 42 is normally in contact with the corresponding centermost zone of the opposed face 34 of the die plate 31 so that the annular lubricant recess 41 defined by the opposed plates 31, 35 is not in communication with the extrusion passage.

Abutting the forward face of the gland plate 35 there is a vertically disposed annular retaining plate 45, which also has a central horizontal extrusion passageway 46 for the plastic forming a continuation of the passageway 33 and 36 and leading smoothly into the elongated confining passage 18 in the vulcanizing tube 17, which is attached to the delivery end of the retaining plate 45. The die plate, gland plate and retaining plate are maintained firmly together by means of horizontal cap screws 47 which pass through suitable holes in the die plate and gland plate and are threaded into the retaining plate.

A nipple 50 threaded into a horizontal hole in the front face of the vertical plate 45 serves to connect the lubricant supply line 16 to a supply passageway 51 in the gland plate 35 leading to the annular lubricant chamber 41.

The vertical face of the retaining plate 45 bears against the forward face of the gland plate over the outer relatively thicker zone 37 of the gland plate. The face 53 of the retaining plate disposed forwardly of the relatively thin inner zone 38 of the gland plate is preferably tapered slightly away from the gland plate toward the center of the extrusion passage to provide a slight clearance space 54 between the inner zone 38 of the gland plate and the retaining plate.

The arrangement is such that when sufficient pressure is exerted by the lubricant within the recess or chamber 41, the inner zone 38 of the gland plate 35 will flex forwardly slightly to produce a slight vertical opening between the outer face 34 of the die plate 31 and the innermost zone 42 of the face of the gland plate and permitting lubricant to pass from the chamber 41 to the surface of the plastic material in the extrusion passageway.

The pressure in the lubricant chamber 41 required to flex the gland plate sufficiently to permit passage of lubricant may be predetermined by adjustment of set screws 56 which are threaded horizontally through the retaining plate 34 from the outer face thereof in relatively closely spaced arrangement, and extend through the tapered inner face 53 of the retaining plate into engagement with the forward opposed face of the inner zone 38 of the gland plate 35. By turning the screws 56 inwardly or outwardly, they may be made to bear against the face of the gland plate with greater or less pressure, thereby determining the magnitude of the pressure that is required in the lubricating chamber 41 to cause lubricant to emerge.

In operation, the plastic material, such as vulcanizable rubber stock 10, is fed continuously by the action of the screw 13 in the extruder 12 through the horizontal extrusion passageways 32, 33, 36 and 46 thereby shaping the material into the form of a rod 11, which becomes vulcanized as it passes through the heated elongated confining chamber 17. A lubricating liquid, e. g., paraffin oil, soap solution, or other antisticking substance that is not deleterious to the plastic being extruded, is introduced by means of the pump 16 through the supply line 16a and passageway 51 into the annular lubricant chamber 41 within the die and lubricating gland assembly 14. The horizontal component of the lubricant pressure in the annular chamber 41 acts against the vertical faces of the chamber, thereby urging the gland plate 35 away from the die plate 34. At their outer extremities, the plates are maintained rigidly together by the retaining screws 47 and by the bushing 30 which holds the die assembly in the recess 15 in the extruder head. When the lubricant pressure becomes sufficiently high, the inner zone 38 of the gland plate 35, being relatively thin and hence more flexible, moves slightly in a horizontal direction, i. e., in the direction of extrusion, into the slight clearance space 54 provided for this purpose. It will be understood that the gland plate is made of material of sufficient elasticity, such as steel, to deflect the desired amount under the influence of the lubricant pressure acting on the vertical faces of the confining chamber 41. As illustrated in Fig. 4, the deflection of the gland plate produces a slight separation 57 between the inner zone 42 of the face 40 of the gland plate 35 and the opposed face 34 of the die plate, thereby permitting lubricant to pass radially between such faces onto the surface of the plastic stream. In practice, the deflection of the gland plate is usually very small, e. g., only 0.002 or 0.003".

The pump 16 is of a reciprocating type, that is, it delivers the lubricant in a rapid series of spurts or surges. Therefore the pressure on the lubricant will be rapidly alternating between a relatively low base value, for example, about 1500 p. s. i. and a relatively higher peak value, for example 3000 p. s. i. The adjustment of the pressure adjusting screws 56 is such that the lube gland is normally closed at the lower pressure value, but opens as the higher pressure value is approached. As a result, there is a continual rapid opening and closing of the lubricating gland corresponding to the pulsations of the pump 16, each stroke of the pump producing a momentary opening of the gland as a result of the hydraulic impact of the lubricating fluid. Since the pressure on the plastic in the extrusion passage will typically be of the order of not more than 500 to 700 p. s. i. it is evident that there will be no tendency for the plastic stock to enter the lubricant opening.

The opening of the lubricating gland occurs most readily at the segments 58 (Fig. 3) of the gland plate intermediate the points at which the pressure adjusting screws 56 bear against the gland plate, since the gland plate is more free to flex at such intermediate segments. As a result, the lubricant flows out of the chamber 41 in the form of a plurality of radial streams, resembling the spokes of a wheel, as indicated by the arrows 59 in Fig. 3.

The lubricating device described presents an open lubricant passageway leading to the plastic mass only when the pressure in the lubricant lines exceeds a certain predetermined value, and such pressure may be predetermined at a value considerably in excess of any pressure that is likely to be developed in the plastic mass itself. In this way clogging of the lubricant supply passageways with plastic is prevented since the lubricating system is open to the plastic only when the pressure of the lubricant is greatly in excess of pressure in the plastic, so that the plastic cannot enter the lubricating system.

From the foregoing it will be evident that the present lubricating device acts in the manner of a series of check valves distributed around the periphery of the plastic mass being extruded. The device is adaptable to production of plastic shapes of large size, or irregular shapes, since the lubricant gland plate may take any cross sectional size or shape corresponding to the size and shape of the shaping die employed, and as many pressure adjusting devices, such as set screws 56, may be disposed as desired in regular or irregular spacing around the periphery of the lubricant gland plate to produce an evenly distributed supply of lubricant, even though the shape being extruded may be quite irregular in cross section.

It will be noted that the device provides a check valve action which still provides an essentially smooth continuous passageway for the plastic stream. Therefore there is no tendency for the device to produce markings or irregularities on the surface of the plastic.

It will also be noted that the opening and closing of the lubricating gland is essentially independent of any pressure variation within the plastic mass itself. Therefore, uniform continuous lubrication can be achieved even though the pressure within the plastic may vary from time to time during the shaping operation.

Because the present lubricating gland opens in response to what is in effect a hydraulic impact due to pulsations produced by the lubricating pump, the distribution of the lubricant tends to be substantially uniform independently of irregularities in the shape of the extrusion passage and independently of local variations in the pressure of the plastic in the extrusion passage.

Having thus described our invention, what we claim and desire to protect by Letters Patent is:

1. In an apparatus for advancing a confined plastic mass with respect to a confining surface of a stationary member, lubricating means for preventing friction between the surface of said plastic mass and said confining surface comprising two adjacent members in said confining surface having opposed faces disposed transversely of the direction of advancement of said plastic mass, said adjacent members defining a lubricant chamber adjacent said faces, means for maintaining said opposed faces normally in contact until a predetermined lubricant pressure exists in said chamber, and said opposed faces being yieldable with respect to each other at the confining surface in a direction parallel to the direction of movement of said plastic mass when said predetermined pressure is exceed in said lubricant chamber, to present an opening for lubricant leading between said faces transversely of the direction of advancement of the plastic mass from said lubricant chamber to said confining surface.

2. In an apparatus for advancing a confined plastic mass with respect to a confining surface of a stationary member, lubricating means for preventing friction between the surface of such plastic mass and said confining surface comprising two opposed members in said stationary member flush with the said confining surface, said opposed members having opposed faces disposed transversely of the direction of advancement of said plastic mass, said opposed members defining a lubricant chamber adjacent to said faces, a retaining member adjacent to one of said opposed members and slightly spaced therefrom at said confining surface, a set screw threaded through said retaining member in a direction parallel to the direction of travel of said plastic mass and bearing against said spaced opposed member to exert a predetermined pressure thereon to maintain said opposed faces in contact until a predetermined lubricant pressure exists in said chamber, whereupon said opposed faces separate at said confining surface to present an opening for lubricant leading between said faces transversely of the direction of advancement of the plastic mass from said lubricating chamber to said confining surface.

3. A lubricating device for an extrusion apparatus comprising an assembly having an opening therethrough constituting an extrusion passageway, said assembly being comprised of two oppositely disposed plates having contacting faces transverse to the said extrusion passageway, a lubricant distributing passageway located within the assembly between said plates and spaced from the extrusion passageway, pressure exerting members for normally pressing said plates into contact over the area between said lubricating passageway and said extrusion passageway, said pressure exerting members being spaced at intervals on said plates, and at least one of said plates being sufficiently yieldable to move away from the other of said plates when sufficient lubricant pressure is applied within the said lubricant delivery passageway to overcome the pressure exerted by the said pressure exerting members, whereby the normally contacting faces of the said plates separate upon application of a definite lubricant pressure, permitting lubricant to pass from said lubricant passageway to said extrusion passageway.

References Cited in the file of this patent

UNITED STATES PATENTS

| Number | Name | Date |
|---|---|---|
| 2,443,289 | Bailey | June 15, 1948 |
| 2,581,768 | Olson | Jan. 8, 1952 |

FOREIGN PATENTS

| Number | Country | Date |
|---|---|---|
| 20,584 | Great Britain | of 1901 |